United States Patent
Marsh

[15] 3,643,129
[45] Feb. 15, 1972

[54] SOLENOID CONTROL APPARATUS

[72] Inventor: Lawrence C. Marsh, Dearborn Heights, Mich.

[73] Assignee: General Motors Corporation, Detroit, Mich.

[22] Filed: Nov. 30, 1970

[21] Appl. No.: 93,547

[52] U.S. Cl. ...................317/11 R, 307/104, 317/33 SC, 317/148.5 B, 317/151, 317/DIG. 6, 320/1
[51] Int. Cl. .................................................H02h 7/22
[58] Field of Search ...........317/DIG. 6, 33 SC, 151, 148.5 B, 317/123, 11 R; 307/104; 320/1

[56] References Cited

UNITED STATES PATENTS

| | | | |
|---|---|---|---|
| 3,158,791 | 11/1964 | Deneen et al. | 317/148.5 R |
| 3,293,495 | 12/1966 | Smith | 317/DIG. 6 |
| 3,411,045 | 11/1968 | Reyner | 317/DIG. 6 |
| 3,467,894 | 9/1969 | Blume | 317/148.5 B |

*Primary Examiner*—James D. Trammell
*Attorney*—E. W. Christen, C. R. Meland and Tim G. Jagodzinski

[57] ABSTRACT

A solenoid control apparatus includes a control switch connected in series with a solenoid and a power supply. The control switch energizes the solenoid with an energizing current when the switch is rendered conductive and deenergizes the solenoid which develops a flyback voltage when the switch is rendered nonconductive. Further, the solenoid control apparatus includes an auxiliary drive circuit comprising a boosting network connected in series with the solenoid and a flyback network connected in parallel with the solenoid. The flyback network includes a Zener diode for limiting the flyback voltage to a maximum level. The maximum level is sufficiently high to rapidly decrease the energizing current through the solenoid as the control switch is rendered nonconductive thereby to minimize the pull-in time of the solenoid. However, the maximum level is sufficiently low to protect the control switch from damage due to the flyback voltage. The boosting network includes the parallel combination of a storage leg, a bypass leg and a reset leg. The storage leg includes a storage capacitor connected to discharge through the solenoid to temporarily increase the energizing current through the solenoid as the control switch is rendered conductive thereby to minimize the pull-in time of the solenoid. The bypass leg includes a bypass diode connected to shunt energizing current around the storage capacitor to maintain the solenoid energized after the capacitor has discharged through the solenoid. The reset leg includes a reset inductor connected to combine with the storage capacitor to form a parallel resonant circuit which oscillates for a half-cycle to charge the capacitor.

3 Claims, 1 Drawing Figure

PATENTED FEB 15 1972
3,643,129
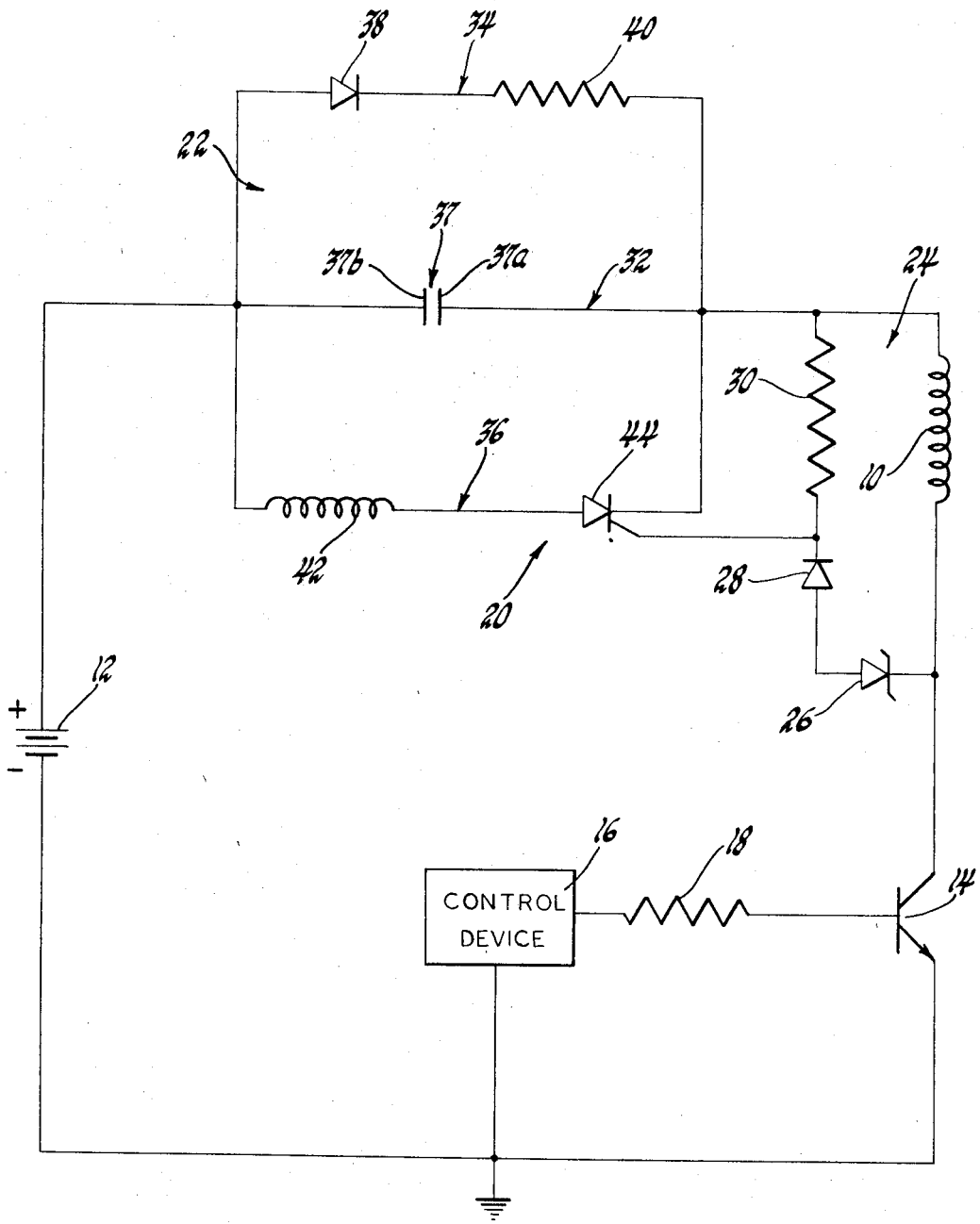
INVENTOR.
Lawrence C. Marsh
BY
Tim G. Jagodzinski
ATTORNEY

SOLENOID CONTROL APPARATUS

This invention relates to a solenoid control apparatus for minimizing the response time of the solenoid. More particularly, the invention relates to an auxiliary drive circuit for temporarily increasing the energizing current through a solenoid as the solenoid is energized and for rapidly decreasing the energizing current through the solenoid as the solenoid is deenergized.

A solenoid is an inductive coil or winding which generates an electromagnetic field in response to the passage of energizing current therethrough. Solenoids are commonly utilized as actuating elements in a variety of electromagnetic devices, such as relays and valves. A typical solenoid control circuit includes a control switch connected in series with the solenoid and a power supply. The solenoid is energized when the control switch is rendered conductive and is deenergized when the control switch is rendered nonconductive.

Due to the inductive properties of a solenoid, the energizing current through the solenoid cannot change instantaneously with the operation of the control switch. Hence, the interval between the time when the control switch is rendered conductive and the time when the energizing current through the solenoid builds to a specified level may be defined as the "pull-in" time of the solenoid. Conversely, the interval between the time when the control switch is rendered nonconductive and the time when the energizing current through the solenoid decays to a specified level may be defined as the "dropout" time of the solenoid.

Together, the pull-in time and the dropout time of a solenoid determine the response time of the electromagnetic device which is actuated by the solenoid. Ordinarily, it is desirable to minimize both the pull-in time and the dropout time of a solenoid in order to optimize the time response of the actuated electromagnetic device. The present invention provides a simple but effective solenoid control apparatus for accomplishing this desired objective.

Further, due to the inductive characteristics of a solenoid, a relatively large flyback voltage is developed across the solenoid as it is deenergized. Normally, the maximum voltage rating of the control switch is well below the flyback voltage produced by the solenoid. This is especially true where the control switch is provided by a transistor or other voltage sensitive semiconductor device. Accordingly, it is usually necessary to protect the control switch from damage due to the excessive flyback voltage. The present invention proposes a solenoid control apparatus which meets this requirement.

According to one aspect of the invention, a solenoid control apparatus includes an auxiliary drive circuit comprising a boosting network connected in series with the solenoid and a flyback network connected in parallel with the solenoid. The boosting network temporarily increases the energizing current through the solenoid as the control switch is rendered conductive thereby to minimize the pull-in time of the solenoid. The flyback network regulates the flyback voltage developed by the solenoid when the control switch is rendered nonconductive thereby to minimize the dropout time of the solenoid.

In another aspect of the invention, the flyback network includes a Zener diode which is connected to establish a flyback current which limits the flyback voltage to a maximum level. The maximum level is sufficiently high to rapidly decrease the energizing current through the solenoid as the control switch is rendered nonconductive thereby to minimize the dropout time of the solenoid. However, the maximum level is sufficiently low to protect the control switch from damage due to the flyback voltage.

As contemplated by a further aspect of the invention, a steering diode and a limiting resistor are connected in series with the Zener diode in the flyback network. The steering diode is connected to block the energizing current and to pass the flyback current. The limiting resistor is connected to develop a trigger signal in response to the flyback current.

In yet another aspect of the invention, the boosting network includes the parallel combination of a storage leg, a bypass leg and a reset leg. The storage leg is operable from a charged condition to a discharged condition to temporarily increase the energizing current through the solenoid as the control switch is rendered conductive. The bypass leg shunts energizing current around the storage leg to maintain the solenoid energized after the storage leg has reached the discharged condition. The reset leg cocks the storage leg from the discharged condition to the charged condition when the solenoid is deenergized.

According to still a further aspect of the invention, the storage leg includes a storage capacitor. The storage capacitor is connected to initially discharge through the solenoid from a first sense to increase the energizing current through the solenoid as the control switch is rendered conductive thereby to minimize the pull-in time of the solenoid. In addition, the storage capacitor is connected to charge in a second sense while the solenoid is energized with the control switch conductive.

As contemplated by yet another aspect of the invention, the bypass leg includes the series combination of a bypass diode and a bypass resistor. The bypass diode is connected to shunt energizing current around the storage capacitor after the capacitor has discharged from the first sense with the control switch conductive. Further, the bypass diode is connected to block the discharge of the storage capacitor from the first sense through the bypass resistor before the control switch is rendered conductive. The bypass resistor is connected to define the energizing current shunted around the capacitor to maintain the solenoid energized after the capacitor has discharged from the first sense. Also, the bypass resistor is connected to define the extent to which the capacitor charges in the second sense while the solenoid is energized.

In yet still a further aspect of the invention, the reset leg includes the series combination of a reset inductor and a reset thyristor. The reset thyristor includes a control electrode connected in the flyback network to forward bias or turn on the thyristor in response to the trigger signal. When the thyristor is turned on, the reset inductor effectively combines with the storage capacitor to form a parallel resonant circuit which oscillates for a half-cycle. During the initial quarter-cycle of oscillation, the storage capacitor is discharged in the second sense. During the subsequent quarter-cycle of oscillation, the storage capacitor is charged in the first sense thereby to reverse bias or turn off the reset thyristor.

These and other aspects and advantages of the invention will become more apparent by reference to the following detailed description of a preferred embodiment when considered in conjunction with the accompanying drawing.

In the drawing, the sole FIGURE is a schematic diagram of a solenoid control apparatus incorporating the principles of the invention.

Referring to the drawing, a solenoid control apparatus includes a solenoid 10 effectively connected in series with a power supply 12 and a control switch 14. The power supply 12 includes a positive terminal and a negative terminal. The negative terminal of the power supply 12 is connected directly to ground. Preferably, the control switch 14 is provided by a transistor. However, it is to be understood that the control switch 14 may be provided by any appropriate switching device. The control transistor 14 includes a pair of switching electrodes provided by the emitter and collector electrodes and a control electrode provided by the base electrode. The switching electrodes of the transistor 14 are connected in series with the solenoid 10. That is, the emitter electrode of the transistor 14 is connected directly to ground while the collector electrode of transistor 14 is connected to the bottom terminal of the solenoid 10. A control device 16 is connected between ground and the control or base electrode of the transistor 14 through an input resistor 18.

In operation, the conductivity of the transistor 14 is regulated by the control device 16. Specifically, the transistor 14 is forward biased in response to the application of a control signal from the control device 16 through the resistor 18. Conversely, the transistor 14 is reverse biased in response to the removal of the control signal by the control device 16 from the input resistor 18. When forward biased, the transistor 14 is turned on or rendered fully conductive between the switching electrodes to energize the solenoid 10 with an energizing current. When reverse biased, the transistor 14 is turned off or rendered fully nonconductive between the switching electrodes to deenergize the solenoid 10.

Due to the inductive properties of the solenoid 10, a flyback voltage is developed across the solenoid 10 as the transistor 14 is turned off. The flyback voltage, which tends to maintain the energizing current through the solenoid 10, typically exceeds the maximum voltage rating of the transistor 14. Accordingly, in a manner which will be more fully described later, the illustrated solenoid control apparatus protects the transistor 14 from damage due to the flyback voltage.

Further, as dictated by the inductive characteristics of the solenoid 10, the energizing current through the solenoid 10 cannot change instantaneously with the operation of the control transistor 14. Hence, the interval between the time when the transistor 14 is rendered fully conductive and the time when the energizing current through the solenoid 10 builds to a specified level may be defined as the "pull-in" time of the solenoid 10. Conversely, the interval between the time when the transistor 14 is rendered fully nonconductive and the time when the energizing current through the solenoid 10 decays to a specified level may be defined as the "dropout" time of the solenoid 10.

The solenoid 10 may be provided by any suitable inductive coil or winding capable of generating an electromagnetic field in response to the passage of an energizing current therethrough. Ordinarily, an electromagnetic device, such as a relay or a valve (not shown), is actuated by the electromagnetic field of the solenoid 10. The response time of the actuated electromagnetic device is dependent upon the pull-in time and the dropout time of the solenoid 10. Normally, it is desirable to minimize the response time of the actuated electromagnetic device. As an example, the solenoid 10 may actuate an electromagnetic fuel injector for an internal combustion engine. In such an application, it is important that the response time of the electromagnetic fuel injector be as fast as possible in order to insure the accurate metering of fuel to the engine.

In the illustrated solenoid control apparatus, the pull-in time and dropout time of the solenoid 10 are minimized by an auxiliary drive circuit 20 having a boosting network 22 and a flyback network 24. The boosting network 22 is effectively connected in series with the solenoid 10 while the flyback network 24 is effectively connected in parallel with the solenoid 10. Specifically, the boosting network 22 is connected between the positive terminal of the power supply 12 and the top terminal of the solenoid 10. The flyback network 24 is connected between the top and bottom terminals of the solenoid 10. The boosting network 22 temporarily increases the energizing current through the solenoid 10 as the transistor 14 is turned on or rendered fully conductive thereby to minimize the pull-in time of the solenoid 10. The flyback network 24 regulates the flyback voltage developed across the solenoid 10 as the transistor 14 is turned off or rendered fully nonconductive thereby to minimize the dropout time of the solenoid 10.

The flyback network 24 includes the series combination of a Zener diode 26, a steering diode 28 and a limiting resistor 30. The Zener diode 26 is connected in the flyback network to establish a flyback current which limits the flyback voltage to a maximum level. The maximum level is determined by the breakdown level of the Zener diode 26. Thus, as the flyback voltage developed across the solenoid 10 reaches the breakdown level of the Zener diode 26, the Zener diode 26 conducts a flyback current through the flyback network 24 to limit the flyback voltage to the maximum level or breakdown level.

Due to the inductive properties of the solenoid 10, the greater the rise of the flyback voltage developed across the solenoid 10, the more rapid the decrease in the energizing current through the solenoid 10. Consequently, the maximum level defined by the Zener diode 26 must be sufficiently high to rapidly decrease the energizing current through the solenoid 10 thereby to minimize the dropout time of the solenoid 10. On the other hand, the maximum level defined by the Zener diode 26 must be sufficiently low to protect the transistor 14 from damage due to the flyback voltage. The steering diode 28 is connected in the flyback network 24 to block the energizing current and to pass the flyback current. The limiting resistor 30 is connected in the flyback network 24 to develop a trigger signal thereacross in response to the flyback current.

The boosting network 22 includes a storage leg 32, a bypass leg 34 and a reset leg 36. The storage leg 32 includes a storage capacitor 37 having a right-hand plate $37_a$ and a left-hand plate $37_b$. For discussion purposes, it is assumed that the capacitor 37 is initially charged in a first sense or positive-to-negative from the right-hand plate $37_a$ to the left-hand plate $37_b$. Hence, as the transistor 14 is turned on or rendered fully conductive, the storage capacitor 37 discharges from the first sense to temporarily increase the energizing current through the solenoid 10 thereby to minimize the pull-in time of the solenoid 10. After the storage capacitor 37 has discharged from the first sense, it charges in a second sense or positive-to-negative from the left-hand plate $37_b$ to the right-hand plate $37_a$.

The bypass leg 34 includes the series combination of a bypass diode 38 and a bypass resistor 40. The bypass diode 38 is connected in the bypass leg 34 to shunt current through the bypass resistor 40 around the storage capacitor 37 to maintain or hold the solenoid 10 energized after the capacitor 37 has discharged from the first sense with the transistor 14 turned on. Further, the bypass diode 38 is connected in the bypass leg 34 to prohibit or block the discharge of the storage capacitor 37 from the first sense through the bypass resistor 40 before the transistor 14 is turned on. The bypass resistor 40 is connected in the bypass leg 34 to define the energizing current shunted around the storage capacitor 37 to maintain or hold the solenoid 10 energized after the capacitor 37 has discharged through the solenoid 10. In addition, the resistor 40 is connected in the bypass leg 34 to define the extent to which the storage capacitor 37 is charged in the second sense with the transistor 14 turned on.

The reset leg 36 includes the series combination of a reset inductor 42 and a reset switch 44. Preferably, the reset switch 44 is provided by a thyristor. However, it is to be understood that the reset switch 44 may be provided by any suitable switching device. The reset thyristor 44 includes a pair of switching electrodes provided by the anode and cathode electrodes and a control electrode provided by the gate electrode. The switching electrodes of the thyristor 44 are connected in series with the reset inductor 42. The gate electrode of the thyristor 44 is connected to the junction between the steering diode 28 and the limiting resistor 30 in the flyback network 24. The reset thyristor 44 is forward biased in response to the trigger signal developed across the limiting resistor 30 in the flyback network 28. When forward biased, the thyristor 44 is turned on or rendered fully conductive between the switching electrodes to effectively connect the reset inductor 42 and the storage capacitor 37 in a tank circuit.

More particularly, when the reset thyristor 44 is turned on, the reset inductor 42 combines with the storage capacitor 37 to form a parallel resonant circuit which oscillates for approximately a half-cycle to reverse the charge on the storage capacitor 37 thereby to cock or reset the storage leg 32. During the first quarter-cycle of oscillation, the capacitor 37 discharges from the second sense into the reset inductor 42 through the reset thyristor 44. During the subsequent quarter-cycle of operation, the capacitor 37 charges in the first sense from the reset inductor 42 through the reset thyristor 44. As the storage capacitor 37 charges in the first sense, the reset thyristor 44 is reverse biased. When reverse biased, the thyristor 44 is turned off or rendered fully nonconductive between the switching electrodes to terminate the oscillation of the parallel resonant circuit. With the storage capacitor 37 charged in the first sense, the auxiliary drive circuit 20 including the boosting network 22 and the flyback network 24 is ready to proceed another cycle of operation when the control transistor 14 is again turned on.

In a solenoid control apparatus constructed in accordance with the illustrated embodiment of the invention, the following circuit components and values were found to yield satisfactory results:

| | |
|---|---|
| Power Supply 12 | 12 volts |
| Zener Diode 26 | 24 volts |
| Steering Diode 28 | 1N4007 |
| Bypass Diode 38 | 368M (Westinghouse) |
| Transistor 14 | 2N3055 |
| Reset Thyristor 44 | C140B (General Electric) |
| Solenoid 10 | 1.6 millihenries |
| Reset Inductor 42 | 75 microhenries |
| Storage Capacitor 37 | 500 microfarads |
| Input Resistor 18 | 1.5 ohms |
| Limiting Resistor 28 | 100 ohms |
| Bypass Resistor 40 | 3.3 ohms |

It will now be appreciated that the present invention provides a simple but effective solenoid control apparatus for minimizing the pull-in time and the dropout time of the solenoid while adequately protecting the solenoid control switch from damage due to the flyback voltage. However, it is to be understood that the preferred embodiment of the invention as previously described is shown for illustrative purposes only. Quite naturally, various alterations and modifications may be made to it without departing from the spirit and scope of the invention.

What is claimed is:

1. In an electrical system, the combination comprising: a power supply; a solenoid; a control switch connected in series with the power supply and the solenoid for energizing the solenoid with an energizing current when the control switch is rendered conductive and for deenergizing the solenoid which develops a flyback voltage when the control switch is rendered nonconductive; an auxiliary drive circuit including a boosting network connected in series with the solenoid and a flyback network connected in parallel with the solenoid; the flyback network including a Zener diode connected to limit the flyback voltage to a maximum level sufficiently high to rapidly decrease the energizing current through the solenoid as the control switch is rendered nonconductive thereby to minimize the dropout time of the solenoid; the boosting network including the parallel combination of a storage leg, a bypass leg and a reset leg; the storage leg including a storage capacitor connected to discharge through the solenoid to temporarily increase the energizing current through the solenoid as the control switch is rendered conductive thereby to minimize the pull-in time of the solenoid; the bypass leg including a bypass diode connected to shunt energizing current around the capacitor to maintain the solenoid energized after the capacitor has discharged through the solenoid; and the reset leg including a reset inductor connected to combine with the storage capacitor to form a parallel resonant circuit which charges the storage capacitor when the control switch is rendered nonconductive.

2. In an electrical system, the combination comprising: a power supply; a solenoid; a control switch connected in series with the power supply and the solenoid for energizing the solenoid with an energizing current when the control switch is rendered conductive and for deenergizing the solenoid which develops a flyback voltage when the control switch is rendered nonconductive; an auxiliary drive circuit including a boosting network connected in series with the solenoid and a flyback network connected in parallel with the solenoid; the flyback network including a Zener diode connected to establish a flyback current which limits the flyback voltage to a maximum level, the maximum level high enough to rapidly decrease the energizing current through the solenoid as the control switch is rendered nonconductive thereby to minimize the dropout time of the solenoid, and the maximum level low enough to protect the control switch from damage due to the flyback voltage; the boosting network including the parallel combination of a storage leg, a bypass leg and a reset leg; the storage leg including a storage capacitor connected to discharge through the solenoid to temporarily increase the energizing current through the solenoid when the control switch is rendered conductive thereby to minimize the pull-in time of the solenoid; the bypass leg including a bypass diode connected to shunt energizing current around the storage capacitor to maintain the solenoid energized after the capacitor has discharged through the solenoid when the control switch is rendered conductive; and the reset leg including the series combination of a reset inductor and a reset switch, the reset inductor connected to combine with the storage capacitor to form a parallel resonant circuit when the reset switch is rendered conductive; the reset switch connected to the flyback network and response to the flyback current to place the parallel resonant circuit in oscillation for a half-cycle to charge the storage capacitor.

3. In an electrical system, the combination comprising: a power supply; a solenoid; a control transistor connected in series with the power supply and the solenoid for energizing the solenoid with an energizing current when the transistor is turned on and for deenergizing the solenoid which develops a flyback voltage when the transistor is turned off; an auxiliary drive circuit including a boosting network connected in series with the solenoid and a flyback network connected in parallel with the solenoid; the flyback network including the series combination of a Zener diode, a steering diode and a limiting resistor; the Zener diode connected to establish a flyback current for limiting the flyback voltage to a maximum level, the maximum level sufficiently high to rapidly decrease the energizing current through the solenoid as the transistor is turned off thereby to minimize the dropout time of the solenoid, and the maximum level sufficiently low to protect the transistor from damage due to the flyback voltage; the steering diode connected to block the energizing current and to pass the flyback current; the limiting resistor connected to develop a trigger signal in response to the flyback current; the boosting network including the parallel combination of a storage leg, a bypass leg and a reset leg; the storage leg including a storage capacitor, the storage capacitor connected to initially discharge through the solenoid from a first sense to temporarily increase the energizing current through the solenoid as the transistor is turned on thereby to minimize the pull-in time of the solenoid, and the storage capacitor connected to subsequently charge in a second sense after the capacitor has discharged from the first sense; the bypass leg including the series combination of a bypass diode and a bypass resistor, the bypass diode connected to shunt energizing current around the storage capacitor after the capacitor has discharged through the solenoid from the first sense when the transistor is turned on, and the bypass diode connected to block the discharge of the capacitor from the first sense through the bypass resistor before the transistor is turned on, the bypass resistor connected to define the energizing current shunted around the storage capacitor to maintain the solenoid energized, and the bypass resistor connected to define the extent to which the storage capacitor is charged in the second sense; the reset leg including the series combination of a reset inductor and a reset thyristor, the reset thyristor having a control electrode connected in the flyback network to turn on the thyristor in response to the trigger signal, and the reset inductor connected to combine with the storage capacitor when the thyristor is turned on to form a parallel resonant circuit which oscillates for a half-cycle to discharge the capacitor from the second sense during the initial quarter-cycle of oscillation and to charge the capacitor in the first sense during the subsequent quarter-cycle of oscillation thereby to turn off the reset thyristor.